United States Patent [19]

Hanson et al.

[11] Patent Number: 5,284,024
[45] Date of Patent: Feb. 8, 1994

[54] METHOD OF DETECTING SHORT CYCLING OF AIR DISCHARGED BY A REFRIGERATION UNIT

[75] Inventors: Jay L. Hanson; Gerald J. Ladendorf, both of Bloomington; Doyle G. Herrig, Elko, all of Minn.

[73] Assignee: Thermo King Corporation, Minneapolis, Minn.

[21] Appl. No.: 23,020

[22] Filed: Feb. 25, 1993

[51] Int. Cl.⁵ .................................... F25B 49/00
[52] U.S. Cl. ................................. 62/126; 62/130
[58] Field of Search ............ 62/125, 126, 127, 129, 62/130, 203, 208, 209

[56] References Cited

U.S. PATENT DOCUMENTS

| | | | |
|---|---|---|---|
| 4,790,143 | 12/1988 | Hanson | 62/126 |
| 4,977,751 | 12/1990 | Hanson | 62/81 |
| 5,123,252 | 6/1992 | Hanson | 62/89 |
| 5,123,253 | 6/1992 | Hanson et al. | 62/89 |
| 5,140,825 | 8/1992 | Hanson et al. | 62/89 |
| 5,140,826 | 8/1992 | Hanson et al. | 62/115 |
| 5,172,561 | 12/1992 | Hanson et al. | 62/130 X |
| 5,181,389 | 1/1993 | Hanson et al. | 62/130 X |
| 5,201,185 | 4/1993 | Hanson et al. | 62/126 X |
| 5,201,186 | 4/1993 | Hanson | 62/126 |
| 5,222,368 | 6/1993 | Hanson | 62/129 X |

Primary Examiner—Harry B. Tanner
Attorney, Agent, or Firm—M. J. Moran

[57] ABSTRACT

A method of monitoring a refrigeration unit including detecting premature return of air discharged into a conditioned space, and distinguishing this "short cycling" problem from a refrigeration capacity problem. The method includes determining the rates of change of the temperatures DA and RA of the discharge air and return air, respectively, during temperature pull down of the conditioned space, and comparing the rates of change with predetermined constants selected to detect a short cycling of the discharge air. When the rates of change do not fit a normal temperature pull down, the differential ΔD between the temperatures DA and RA of the discharge air and return air is determined and compared with a third constant. Predetermined results of the comparisons of the rates of changes of DA and RA, and the temperature difference ΔD with the first, second and third constants, respectively, are utilized to identify proper air flow in conditioned space, to indicate a problem with air flow in conditioned space, and to indicate that refrigeration capacity should be checked.

17 Claims, 7 Drawing Sheets

| 242 ROM MAP (°C) | | | |
|---|---|---|---|
| | SUB: 1 | SUB: 2 | SUB: 3 |
| T1 | 10F(5.5) | 8F(4.4) | 6F(3.3) |
| T2 | 3F(1.6) | 2F(1.1) | 1F(5.5) |
| T3 | 10F(5.5) | 8F(4.4) | 6F(3.3) |

*FIG.5*

| 244 RAM MAP |
|---|
| URF |
| AFF |
| AA |
| RA |
| DA |
| SRA |
| SDA |
| TF30 |
| TF10 |
| ΔD |
| DT30 |
| DT10 |

METHOD OF DETECTING SHORT CYCLING OF AIR DISCHARGED BY A REFRIGERATION UNIT

TECHNICAL FIELD

The invention relates in general to refrigeration units, and more specifically to the detection of short cycling of air discharged by a refrigeration unit into a conditioned space.

BACKGROUND ART

In order for a refrigeration unit, such as a transport refrigeration unit, to efficiently maintain a conditioned space and its associated load in a predetermined temperature range close to a selected set point temperature, it is important that air distribution throughout the conditioned space be proper. The refrigeration unit, via an evaporator fan or blower, discharges conditioned air into the conditioned space from a discharge air outlet associated with an evaporator plenum. Air is drawn from the conditioned space by the evaporator fan or blower back into the evaporator plenum via a return air inlet.

The discharge air should circulate throughout the conditioned space so that heat exchange between the conditioned air and load is as uniform as possible throughout the entire load, before the air is allowed to return to the air inlet. To insure uniform, highly efficient heat transfer between the conditioned air and load, chutes and/or bulkheads are often installed in the conditioned space. If conditioned air is allowed to return prematurely to the evaporator plenum, a condition which is called "short cycling", the heat transfer efficiency suffers, and the load in the conditioned space will not be uniformly conditioned. Short cycling may be caused, for example, by improper installation of air chutes and/or bulk heads in the conditioned space.

Refrigeration unit monitoring and diagnostic programs of the prior art may, upon encountering short cycling, incorrectly indicate a fault with the refrigeration unit, identifying low refrigeration capacity as the cause. It would be desirable, and it is an object of the present invention, to provide monitoring and diagnostic methods which differentiate between a short cycling air flow problem and a refrigeration capacity problem.

SUMMARY OF THE INVENTION

Briefly, the present invention is a method of monitoring the operation of a refrigeration unit which includes a return air inlet and a discharge air outlet in air flow communication with a conditioned space, with the refrigeration unit conditioning air returning from the conditioned space via the air inlet and discharging conditioned air back into the conditioned space via the discharge air outlet. The invention includes detecting a short cycling condition wherein air from the discharge air outlet returns prematurely to the return air inlet. The method of detecting short cycling includes the steps of measuring the temperatures DA and RA of the discharge air and return air, respectively, detecting changes of the discharge air temperature DA and the return air temperature RA over a predetermined period of time, comparing a detected change of the temperature DA of the discharge air with a first constant, comparing a detected change of the temperature RA of the return air with a second constant, and indicating that air flow in the conditioned space is proper in response to predetermined results of the comparison steps.

In a preferred embodiment, the predetermined results of the comparison steps which indicate proper air flow include the steps of finding that a detected change in temperature DA of the discharge air is greater than the first constant, and finding that a detected change in temperature RA of the return air is less than the second constant.

In a preferred embodiment, when the step of comparing a detected change in the temperature DA with the first constant finds that a detected change in the temperature DA of the discharge air did not exceed the first constant, the method further includes the steps of detecting changes in the temperature DA of the discharge air and in the temperature RA of the return air over a longer period of time than the predetermined period of time. The method then includes the steps of comparing a detected change in the return air temperature DA over the longer period of time with the first constant, comparing a detected change in the return air temperature RA over the longer period of time with the second constant, and indicating air flow in the conditioned space is proper in response to predetermined results of the comparison steps associated with the longer period of time.

In a preferred embodiment, the method also includes the steps of determining the difference ΔD between the temperatures DA and RA obtained in the measuring steps. The method further includes comparing the difference ΔD with a third constant, and indicating a fault condition related to air flow in the conditioned space in response to predetermined results of the steps of respectively comparing a detected change in the temperature DA, a detected change in the temperature RA, and ΔD, with the first, second and third constants. The predetermined results of the comparison steps which result in a fault indication include the steps of finding that the change in temperature DA of the discharge air is larger than the first constant, finding that the change in temperature RA of the return air is larger than the second constant, and finding that the difference value ΔD is less than the third constant.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
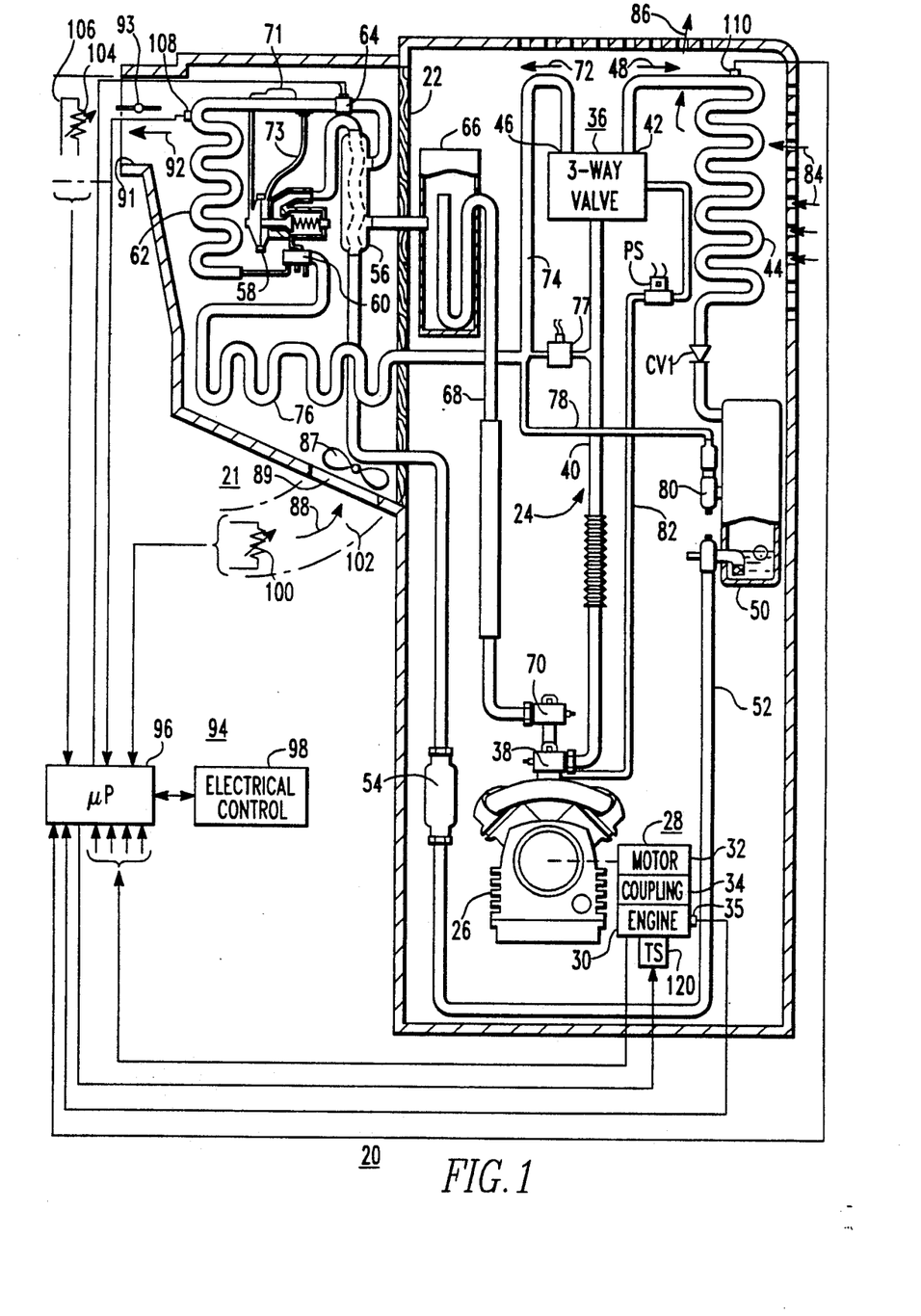
FIG. 1 is a partially block and partially schematic diagram of a refrigeration unit which may utilize the methods of the invention.

Referring now to the drawings, and to FIG. 1 in particular, there is shown a refrigeration unit 20 which may utilize the methods of the invention. Refrigeration unit 20 controls the temperature of a conditioned space 21 to a predetermined temperature range adjacent to a selected set point temperature. Refrigeration unit 20 is especially suitable for use in transport applications, and as such may be mounted on a container, truck, or trailer, such as on a wall 22 thereof, for example. Refrigeration unit 20 has a closed fluid refrigerant circuit or flow path 24 which includes a refrigerant compressor 26 driven by a prime mover arrangement 28. Prime mover arrangement 28 includes an internal combustion engine 30, and an optional stand-by electric motor 32. Engine 30 and motor 32, when both are utilized, are coupled to compressor 26 by a suitable clutch or coupling 34 which disengages engine 30 while motor 32 is operative. A selector 174 shown in FIG. 2A selects one of the two prime movers and provides an output on conductor to identify the selection.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first outlet port 42, which is selected to initiate a cooling cycle, with the first outlet port 42 being connected to the inlet side of a condenser coil 44. Three-way valve 36 has a second outlet port 46, which is selected to initiate a heating cycle.

When three-way valve 36 selects the cooling cycle outlet port 42, it connects compressor 26 in a first refrigerant flow path 48, which in addition to condenser coil 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and an equalizer line 73.

When three-way valve 36 selects the heating cycle outlet port 46, it connects compressor 26 in a second refrigerant flow path 72. The second refrigerant flow path 72 by-passes condenser coil 44 and expansion valve 58, connecting the hot gas output of compressor 26 to the refrigerant distributor 60 via a hot gas line 74 and a defrost pan heater 76. A hot gas by-pass solenoid valve 77 may optionally be disposed to inject hot gas into hot gas line 74 during a cooling cycle. A by-pass or pressurizing line 78 connects hot gas line 74 to receiver 50 via by-pass and check valves 80, to force refrigerant from receiver 50 into an active refrigerant flow path during heating and defrost cycles.

A conduit or line 82 connects three-way valve 36 to the low pressure side of compressor 26 via a normally closed pilot solenoid valve PS. When solenoid valve PS is de-energized and thus closed, three-way valve 36 is spring biased to select the cooling cycle outlet port 42. When evaporator coil 62 requires defrosting, and when a load being conditioned in conditioned space 21 requires heat to maintain set point, pilot solenoid valve PS is energized and the low pressure side of compressor 26 operates three-way valve 36 to select the heating cycle outlet port 46 to initiate a heating cycle or a defrost cycle.

A condenser fan or blower (not shown), which may be driven by prime mover arrangement 28, causes ambient air 84 to flow through condenser coil 44, with the resulting heated air 86 being discharged to the atmosphere. An evaporator fan or blower 87, which also may be driven by prime mover arrangement 28, draws air 88, called "return air", from conditioned space 21, through an inlet 89 in an evaporator plenum 90 in which the evaporator coil 62 is mounted, and the resulting conditioned cooled or heated air 92, called "discharge air", is returned or discharged by fan 87 into conditioned space 21 via an outlet 91. During an evaporator defrost cycle a defrost damper 93 may be operated to close the discharge air path to conditioned space 21.

Figure 2A:
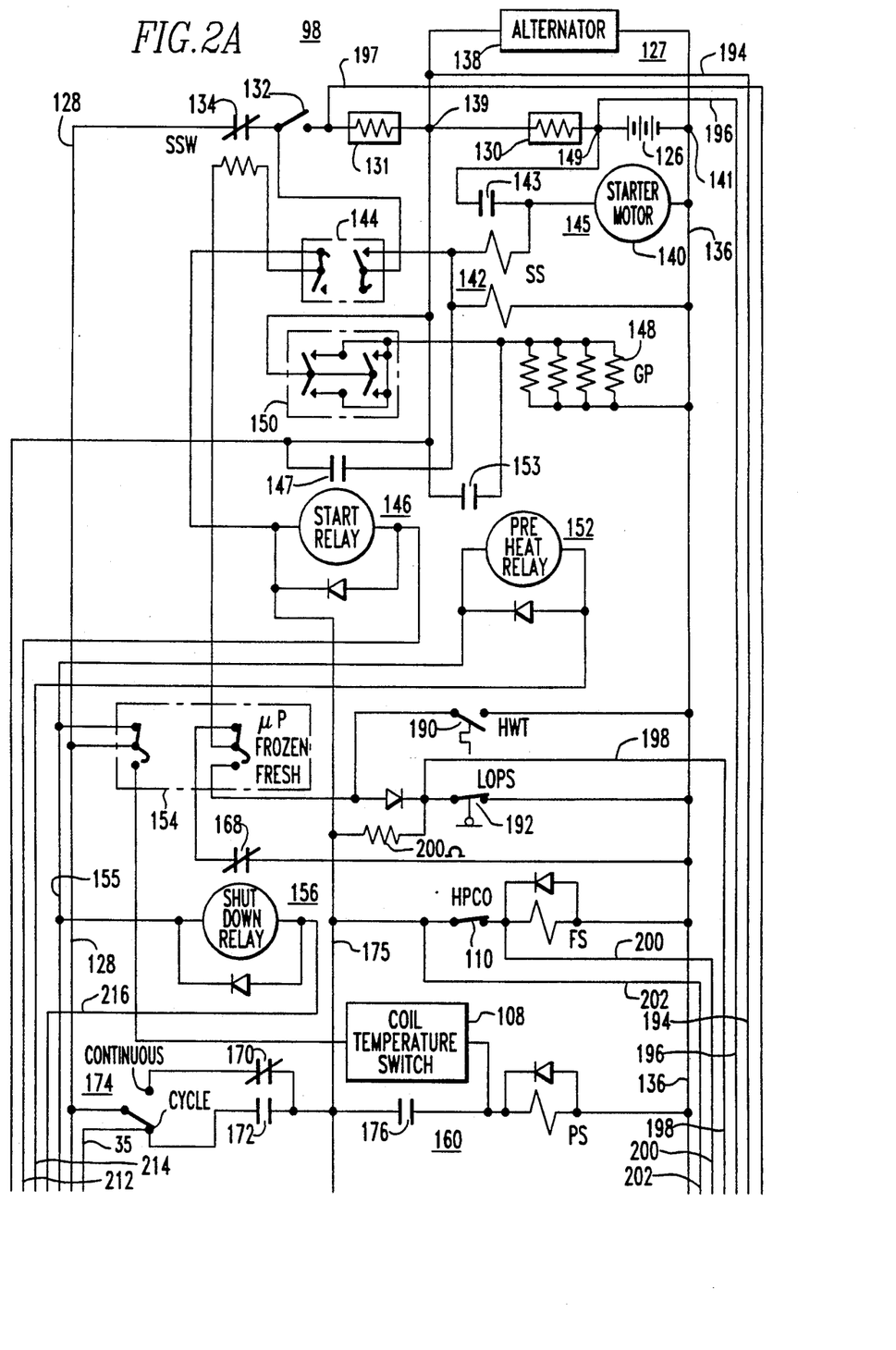
FIGS. 2A and 2B may be assembled to provide an electrical schematic diagram of microprocessor based electrical control shown in block form in FIG. 1.
Figure 2B:
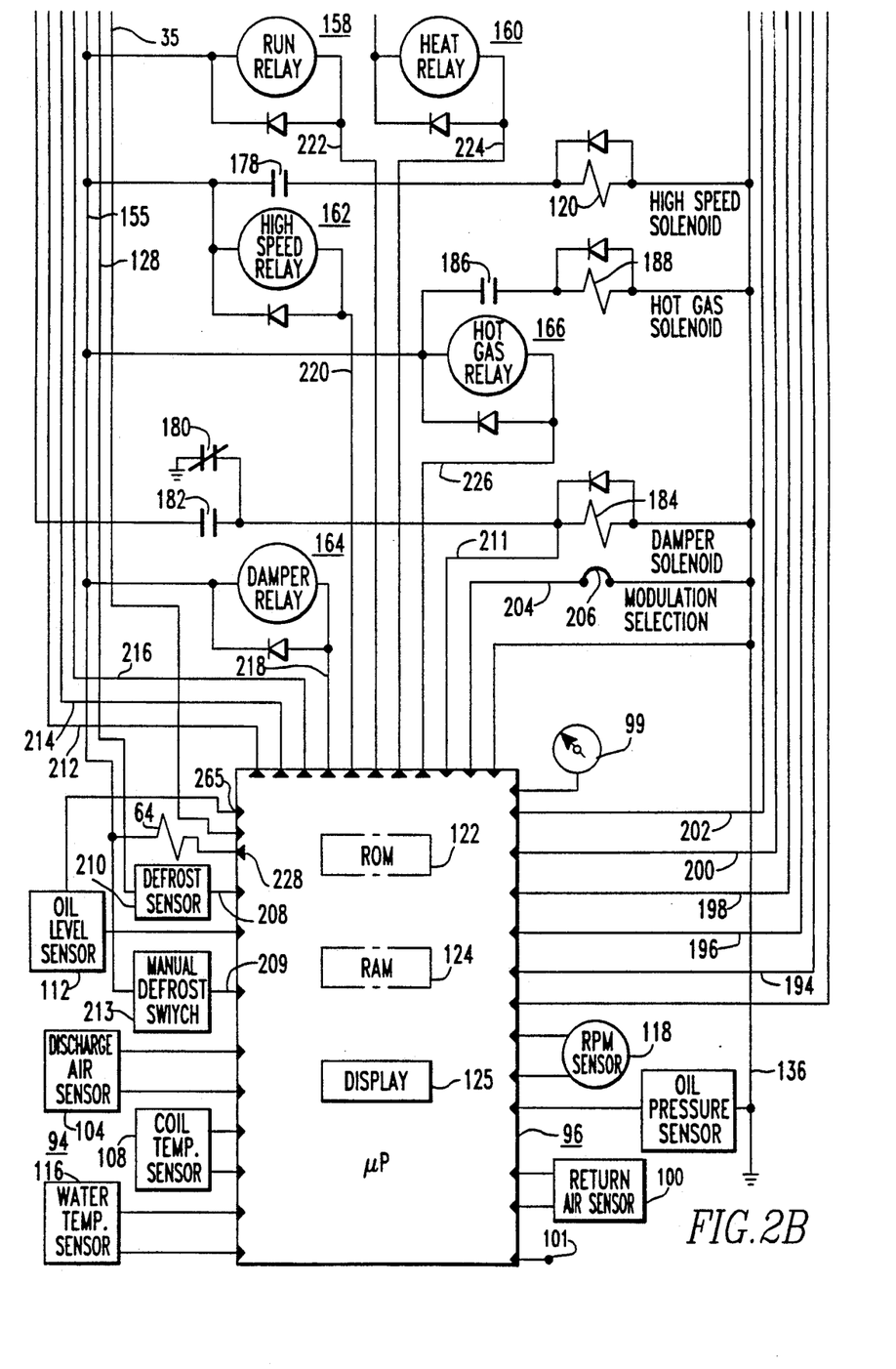

Transport refrigeration unit 20 is controlled by electrical control 94 which includes a microprocessor based controller 96 and electrical control circuits and components 98. Electrical control circuits and components 98 includes relays, solenoids, and the like, as will be explained relative to FIGS. 2A and 2B. As shown in FIGS. 1, 2A and 2B, controller 96 receives input signals from appropriate sensors, including inputs from a set point temperature selector 99 which may be actuated to select the desired temperature of conditioned space 21; an ambient air temperature sensor 101; a temperature sensor 100 disposed in a return air path 102 to indicate the temperature RA of the return air 88; a temperature sensor 104 disposed in a discharge air path 106 to indicate the temperature DA of the discharge air 92; a coil temperature sensor and switch 108 disposed to sense the temperature of the evaporator coil 62; a refrigerant pressure sensor (HPCO) 110 disposed on the high pressure side of the refrigerant flow path 24; and from various engine sensors shown in FIG. 2B. Such engine sensors, for example, may include an oil level sensor 112, an oil pressure sensor 114, an engine coolant temperature sensor 116, and an engine speed sensor 118.

Controller 96, among other things, controls modulation valve 64, hot gas valve 77, and a throttle or high speed solenoid 120 which selects high and low operating speeds of engine 30. Other functions controlled by controller 96 are shown in FIGS. 2A and 2B, and will be hereinafter described.

FIGS. 2A and 2B may be assembled to provide a detailed schematic diagram of electrical control 94, which includes microprocessor based controller 96 and control circuits and components 98. Controller 96 includes a read-only-memory (ROM) 122 for storing programs and look-up tables to be hereinafter described, and a random-access-memory (RAM) 124 for software timers, flags, input signals, output signals, and other variables generated by the operating programs. Controller 96 also includes a display 125 for displaying fault codes, for illuminating or flashing an alarm icon or indicator, for displaying system status via status lights, and the like.

Electrical control circuits and components 98 include a source of potential or power supply 127 having first and second conductors 128 and 136, respectively. Power supply 127 includes a battery 126 which has one side connected to the first power supply conductor 128 via a first DC current measuring shunt 130, which is used to measure battery charge and discharge current, and a second DC current measuring shunt 131, which may be used to measure the current draw of the control circuit and components connected to the power supply conductors 128 and, 136, as described in application Ser. No. 08/046314, filed Apr. 15, 1993. Control 98 further includes an on-off switch 132, and normally closed contacts 134 of a protective reset switch SSW. The remaining side of battery 126 is connected to the second power supply conductor 136, which is grounded. Power supply 127 further includes a generator or alternator 138 driven by prime mover arrangement 28, with the generator or alternator 138 being connected from a junction point 139 between current shunts 130 and 131 to a junction point 141 on grounded conductor 136. Thus, junction points 139 and 141 form output terminals of power supply 127 which provide a voltage and current to the circuits and components connected thereto.

Control 98 also includes engine starting apparatus 145 for engine 30, with engine starting apparatus 145 having a portion which is connected directly to battery 126, eg., to a junction 149 between the battery shunt 130 and battery 126, and a portion which is connected to power supply output terminal 139. More specifically, the portion of starting apparatus 145 which is connected to junction 149 includes a starter motor 140 which is controlled by a starter solenoid 142 having associated normally open contacts 143, an ignition switch 144, and a start relay 146 having associated normally open contacts 147. The portion of starting apparatus 145 which is connected to power supply output terminal 139, to enable current draw to be measured by the battery shunt 130, includes engine pre-heat control, including glow plug resistors (GP) 148, a pre-heat switch 150 and normally open contacts 153 of a pre-heat relay 152.

Control 98 also includes a three-position switch 54 which has two banks of three terminals each comprising a center terminal and upper and lower terminals, with reference to FIG. 2A. Switch 154, in the illustrated upper position which connects the center terminal to the upper terminal, places unit 20 under control of controller 96. The upper position provides voltage from conductor 128 to a conductor 155. An intermediate position of switch 154, in which the center terminal is not connected to either the upper terminal or the lower terminal, is selected when controller 96 is not utilized and the load in the conditioned space 21 is frozen. This switch position will cause unit 20 to operate continuously in a low speed cool mode LSC. The lower position of switch 154 is selected when controller 96 is not utilized and the load in conditioned space 21 is non-frozen. This position of switch 154 will cause unit 20 to operate continuously, switching between heating and cooling cycles under the control of the hereinbefore mentioned coil temperature sensor and switch 108. Coil temperature sensor and switch 108 is preset to close at a predetermined coil temperature, such as 35° F. (1.7° C.), to energize the pilot solenoid PS and initiate a heating cycle, and to open at a predetermined higher temperature, such as 38° F. (3.3° C.), to de-energize pilot solenoid PS and initiate a cooling cycle.

In addition to the control devices or relays already mentioned, control 98 includes control devices in the form of a shutdown relay 156, a run relay 158, a heat relay 160, a high speed relay 162, a defrost damper relay 164, and a hot gas relay 166. Shutdown relay 156 is normally energized, and is de-energized to shut unit 20 down via its associated set of normally-closed contacts 168 which ground the protective switch SSW and cause it to open its contacts 134. Run relay 158 has normally open contacts 172 connected to a mode selector switch 174 which has an input connected to conductor 128. Selector switch 174 selects either: (1) a continuous operating mode in which a prime mover of arrangement 28 operates continuously; or, (2) a cycling start-stop operating mode, which includes starting and stopping a prime mover of the prime mover arrangement 28. The selection is communicated to an input of controller 96 via conductor 35.

Contacts 172 provide voltage to a conductor 175 from conductor 128 and mode selector switch 174. Run relay 158 must be energized to enable the starting and running of refrigeration unit 20 via engine 30. When unit 20 is started, control 98 is arranged to normally start operation in a predetermined operating mode, which in the exemplary embodiment is a low speed cool (LSC) cycling operating mode. The LSC operating mode is selected by the de-energized position of heat relay 160, which selects a cooling cycle, and by the de-energized position of high speed relay 162, which selects the lower of two operating speeds of engine 30. After starting, a set point temperature control algorithm selects high and low speed cooling and heating cycles, as required to achieve and maintain the temperature in conditioned space 21 in a predetermined range adjacent to the selected set point temperature.

Heat relay 160 has a set of normally open contacts 176 for controlling the pilot solenoid PS. High speed relay 162 has a set of normally open contacts 178 for controlling the high speed solenoid 120. Damper relay 164 has a set of normally closed contacts 180 and a set of normally open contacts 182, connected to control a defrost damper solenoid 184 which is linked to defrost damper 93. Hot gas relay 166 is provided for controlling the hot gas valve 77 via a set of normally open contacts 186 and a solenoid 188.

Control 98 also includes a engine coolant temperature switch (HWT) 190, which closes when the engine coolant reaches a predetermined elevated temperature, and a low oil pressure switch (LOPS) 192 which is open as long as engine oil pressure is normal. The closing of either switch 190 or 192 will shut unit 20 down via the manual reset switch SSW.

Controller 96 senses the voltage across the battery shunt 130 via conductors 194 and 196, and can thus determine the magnitude and polarity of battery current. Controller 96 senses the voltage across the control shunt 31 via conductors 197 and 194. Controller 96 can thus determine the magnitude of the current draw provided by the source of potential 127, comprised of battery 126 and alternator 138, to the various components selectively connected by controller 96 between conductors 128 and 136.

Controller 96 also has a conductor 198 which senses the position of the low oil pressure switch 192, conductors 200 and 202 which sense the voltage level on first and second sides, respectively, of the high refrigerant pressure cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, a conductor 211 which detects voltage on the damper solenoid 184, and a conductor 209 which senses when a manually operated defrost switch 213 has been actuated to request a defrost cycle.

Controller 96 has a plurality of output conductors or drive lines for controlling the energization and deenergization of a plurality of control devices, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in modulation valve 64.

As the various functions performed by controller 96 are described, only those necessary to understanding the invention will be described in detail. Certain of the functions may be described in detail and claimed in U.S. Pat. Nos. 5,123,252; 5,123,253; 5,140,825; and 5,140,826, which are assigned to the same assignee as the present application.

When the desired air distribution through out conditioned space 21 is deleteriously altered, such as by improper installation of air chutes and/or bulkheads in conditioned space 21, an undesirable condition called "short cycling" may be created. In short cycling, the discharge air 92 from an outlet 91 returns prematurely to the air return inlet 89.

Figure 3:
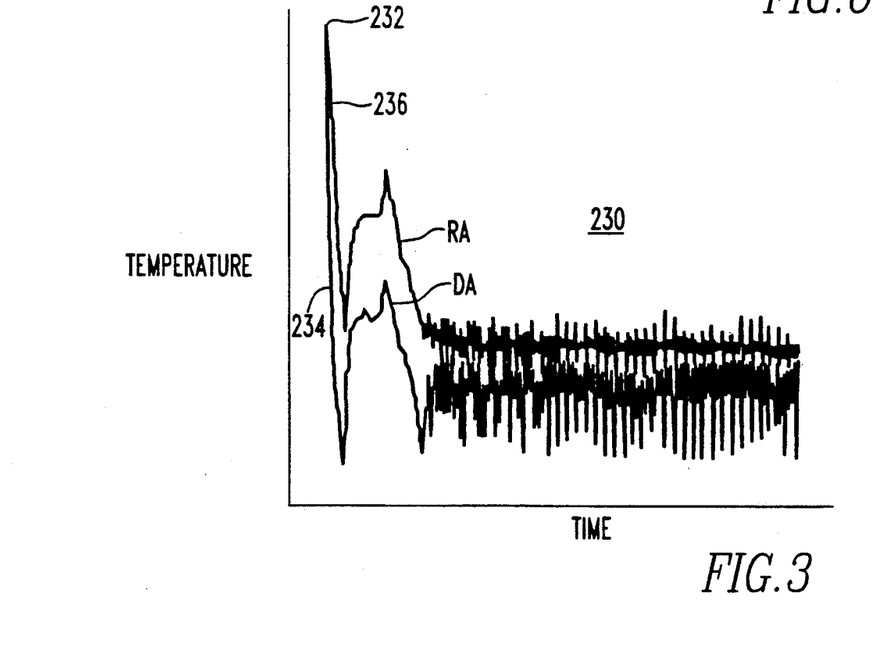
FIG. 3 is a typical temperature versus time graph of a refrigeration unit illustrating temperatures DA and RA of evaporator discharge air and evaporator return air, respectively, during initial temperature pull down and steady state.

For purposes of example, the teachings of the invention will be described starting with the temperature of conditioned space 21 higher than the selected set point temperature, requiring a high speed cooling cycle to rapidly pull the temperature of conditioned space 21 down to the set point temperature. FIG. 3 is a temperature versus time graph 230 which plots the temperatures DA and RA of evaporator discharge air 92 and evaporator return air 88, respectively, for a typical initial temperature pull down of conditioned space 21 to set point, and subsequent steady state operation in a predetermined temperature range adjacent to the set point temperature. During normal operation, at start up point 232, the temperatures DA and RA of the discharge air and return air, respectively, are relatively close together. The temperature DA of the discharge air 92 then starts to change at a much faster rate than the temperature RA of the return air, with a ratio of 4:1 to 6:1 being typical. The temperature DA drops rapidly along curve portion 234, while the temperature RA drops at a slower rate along curve portion 236. This difference in rate of change continues until reaching a maximum differential ΔD between RA and DA, after which time the temperatures RA and DA will change at approximately the same rate.

When short cycling occurs, the temperature RA of the return air during initial temperature pull down changes at a much faster rate than shown in FIG. 3, due to the shorter than normal air distribution path of the air from the discharge outlet 91 to the return inlet 89. In other words, the cold discharge air does not pick up as much heat from the load, as it does not progress through the entire air distribution path. Thus, the temperature difference ΔD between the temperature RA of the return air 88 and the temperature DA of the discharge air 92 is not as large as the normal difference during temperature pull down. A monitoring and diagnostic program, such as illustrated and described in application Ser. No. 07/833,230, filed Feb. 10, 1992 may identify a short cycle condition as a lack of refrigeration capacity. The present invention differentiates between an air flow problem and a problem due to low refrigeration capacity, and thus may be used in conjunction with the invention of application Ser. No. 07,833,230 checking for short cycling before the programs of application Ser. No. 07/833,230, are run.

Figure 4:
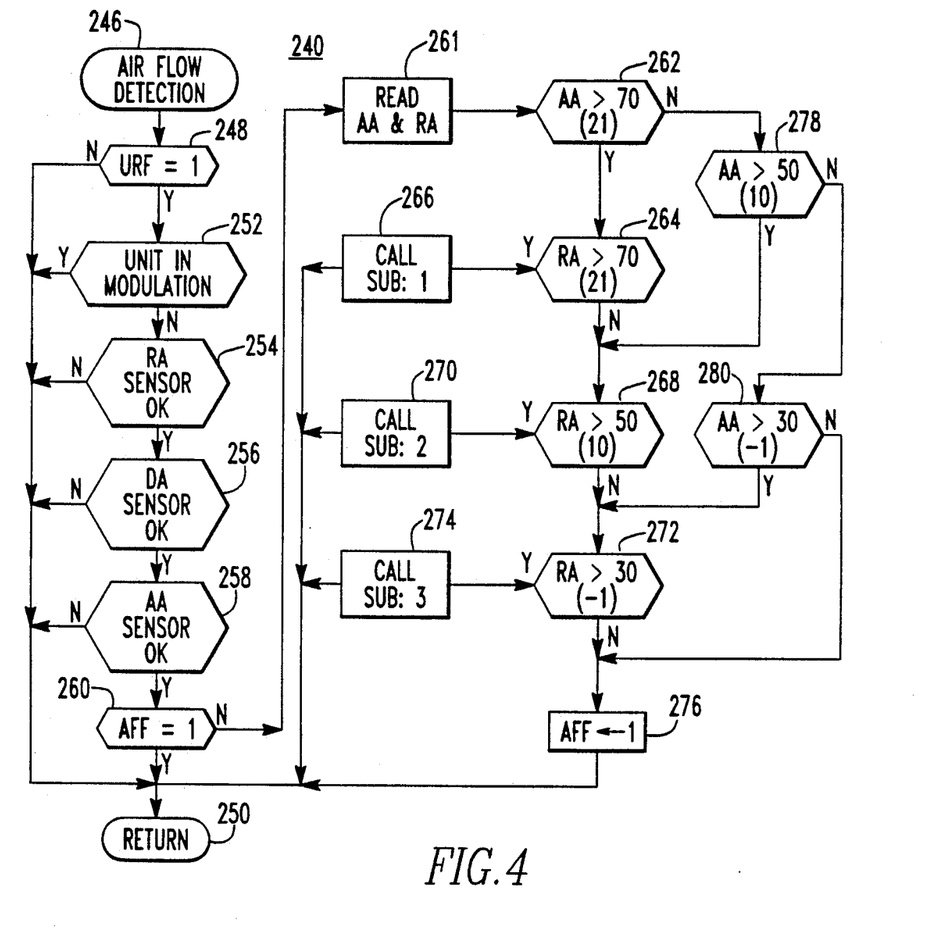
FIG. 4 is a flow diagram of a program which implements the methods of the invention.

FIG. 4 is a flow diagram of a program 240 which implements the teachings of the invention. During the description of program 240, and the description of a subroutine shown in FIGS. 7A and 7B which is called by program 240, a ROM map 242 shown in FIG. 5, and a RAM map 244 shown in FIG. 6, will be referred to. ROM map 242 illustrates a look-up table stored in ROM 122 which contains values for constants T1, T2 and T3 utilized in the subroutine, and RAM map 244 contains program flags, sensor values, software timers, and other variables generated by the programs.

More specifically, program 240 is entered at 246 and a first portion of program 240 determines if an effective check for proper air flow in conditioned space 21 can be made. A first step 248 determines if unit 20 is running, such as by checking the logic level of a unit running flag URF. When unit 20 is started successfully, such as via a program shown in the hereinbefore mentioned U.S. Pat. No. 5,140,826, the unit running flag URF is set to logic one. If step 248 finds unit 20 is not operating, program 240 returns to an executive program at 250.

When step 248 finds unit 20 is operating, step 252 determines if unit 20 is operating in a mode which utilizes suction line modulation. Controller 96 controls current flow through modulation valve 64 via line 228 during suction line modulation, which takes place only during a cooling or a heating cycle of a non frozen load when the temperature of conditioned space 21 is close to the selected set point temperature. If unit 20 is in modulation, it is not a proper time to check for proper air flow. According to the teachings of the invention, proper air flow is checked during initial temperature pull down of conditioned space 21, when distinctive differences between the rates of change in the temperatures DA and RA of the evaporator discharge air and evaporator return air, and the differential ΔD between DA and RA. can be observed and compared with predetermined constants to detect proper and improper air flow.

When step 252 finds that unit 20 is not in modulation, steps 254, 256 and 258 respectively check the conditions of the return air temperature sensor 100, the discharge air temperature sensor 104, and the ambient air temperature sensor 101. The hereinbefore mentioned U.S. Pat. No. 5,123,253 contains a program for checking the conditions of these temperature sensors, and for setting "fail" flags which may be checked by steps 254, 256 and 258. If any of the steps 254, 256, or 258 find a faulty temperature sensor, a reliable air flow determination can not be made, and program 240 exits at 250.

When steps 254, 256 and 258 find the temperature sensors functional, step 260 checks the logic level of an air flow flag AFF stored in RAM 124. Air flow flag AFF is set to a logic one by program 240, or the subroutines, when no problem is detected in the air flow, eg., a proper air flow has either been detected, or present operating conditions of unit 20 are not suitable for checking for proper air flow. Thus, if step 260 finds flag AFF has already been set, there is no need to check air flow again, and program 240 exits at 250.

When step 260 finds flag AFF reset, ie., a logic zero, step 260 proceeds to a portion of program 240 which selects an appropriate subroutine as a function of the ambient air temperature AA and the return air temperature RA. Step 261 reads and stores ambient temperature AA and return air temperature RA in RAM 124, and step 262 compares the temperature AA with a predetermined value, such as a value of 70 when temperature AA is in ° F and a value of 21 when in ° C. If temperature AA exceeds 70° F. (21° C.), step 262 proceeds to step 264 which determines if the temperature RA of the return air 88 is above 70° F. (21° C.). If the temperature RA is above 70° F. (21° C.) step 264 proceeds to step 266 which calls subroutine #1.

If step 264 finds that temperature RA does not exceed 70° F. (21° C.), step 264 goes to step 268 which determines if temperature RA exceeds 50° F. (10° C.). If temperature RA exceeds 50° F. (10° C.) step 268 proceeds to step 270 which calls subroutine #2.

If step 268 finds that temperature RA does not exceed 50° F. (10° C.), step 268 goes to step 272 which determines if temperature RA exceeds 30° F. (−1° C.). If temperature RA exceeds 30° F. (+1° C.), step 272 proceeds to step 274 which calls subroutine #3.

If step 272 finds that the temperature RA of the return air 88 is less than 30° F. (+1° C.), then the relative rates of change of RA and DA required to correctly check for proper air flow will not take place, and step 272 proceeds to step 276 which sets the air flow flag AFF so that step 260 on the next running of program 240 will not continue with the air flow check.

If step 262 finds that the temperature AA of the ambient air does not exceed 70° F. (21° C.), step 262 proceeds to step 278 which determines if temperature AA exceeds 50° F. (10° C.). If temperature AA exceeds 50° F. (10° C.) step 278 proceeds to the hereinbefore described step 268. If temperature AA does not exceed 50° F. (10° C.), step 278 proceeds to step 280 which determines if temperature AA exceeds 30° F. (+1° C.). If temperature AA exceeds 30° F. (+1° C.) step 280 proceeds to the hereinbefore described step 272. If temperature AA does not exceed 30° F. (+1° C.), step 280 proceeds to step 276 which sets flag AFF to logic one, as with the ambient temperature AA below 30° F. (+1° C.) the rates of change of RA and DA, and the differential between them, will not be suitable for making an accurate air flow determination.

Figure 5:
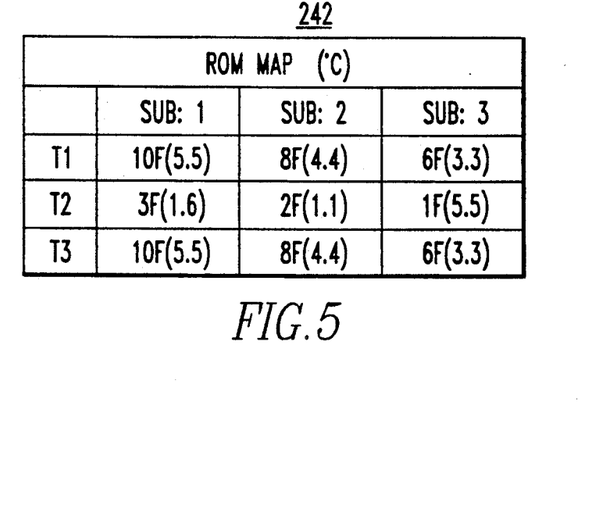
FIG. 5 is a ROM map which illustrates sets of constant values T1, T2 and T3 for three different subroutines called by the program of FIG. 4.
Figure 6:
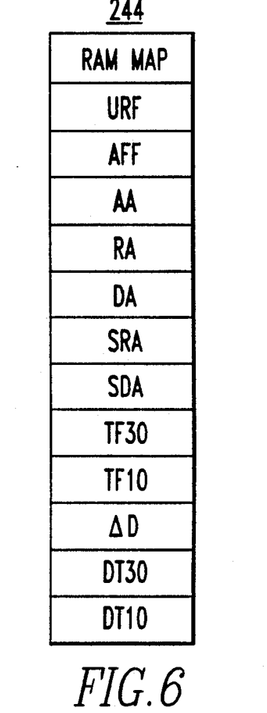
FIG. 6 is a RAM map which lists flags, timers, sensor values, and other variables, generated by the programs of FIGS. 4, 7A and 7B.
Figure 7A:
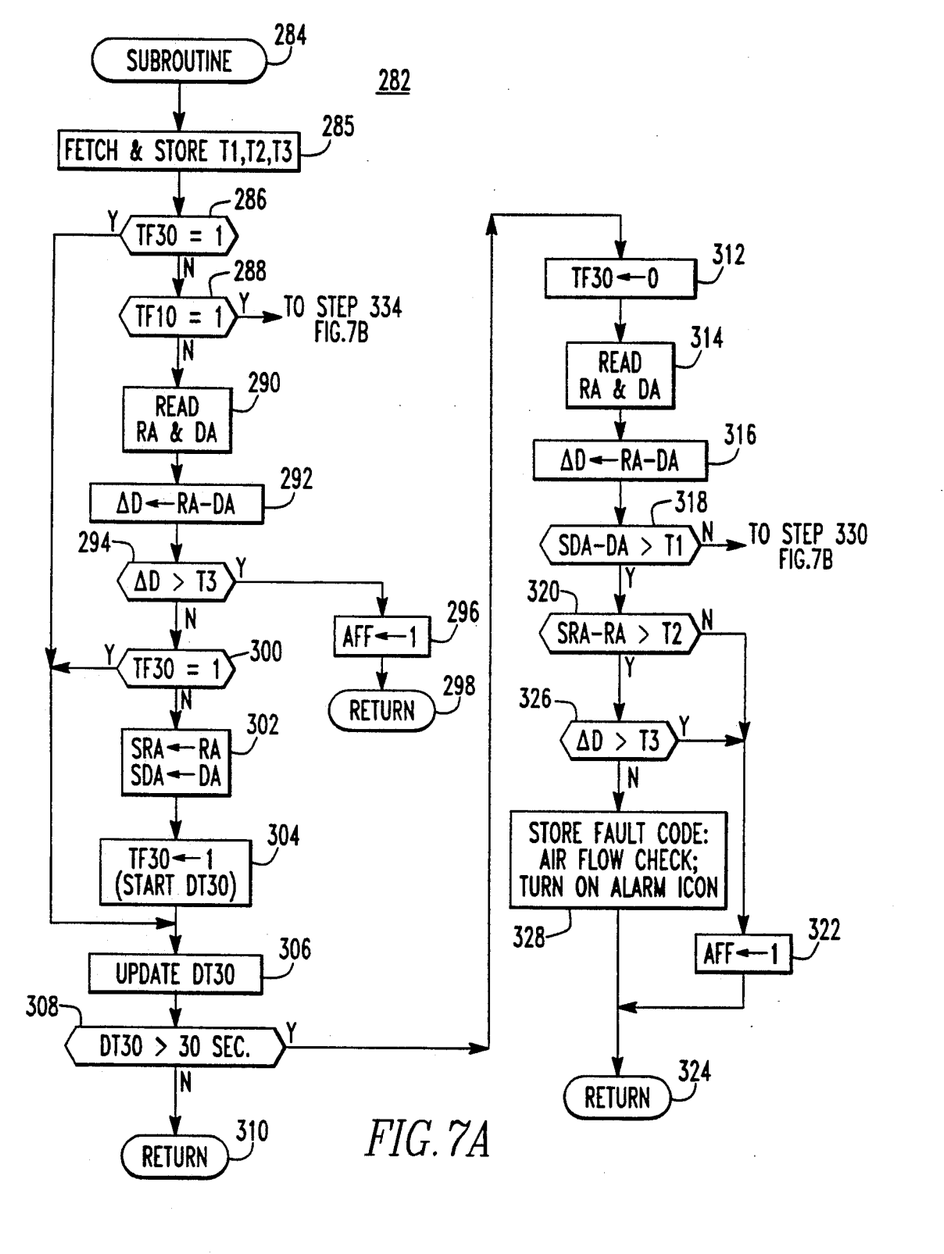
FIGS. 7A and 7B may be assembled to provide a flow diagram of a program of subroutines called by the program of FIG. 4, which implements methods of the invention.
Figure 7B:
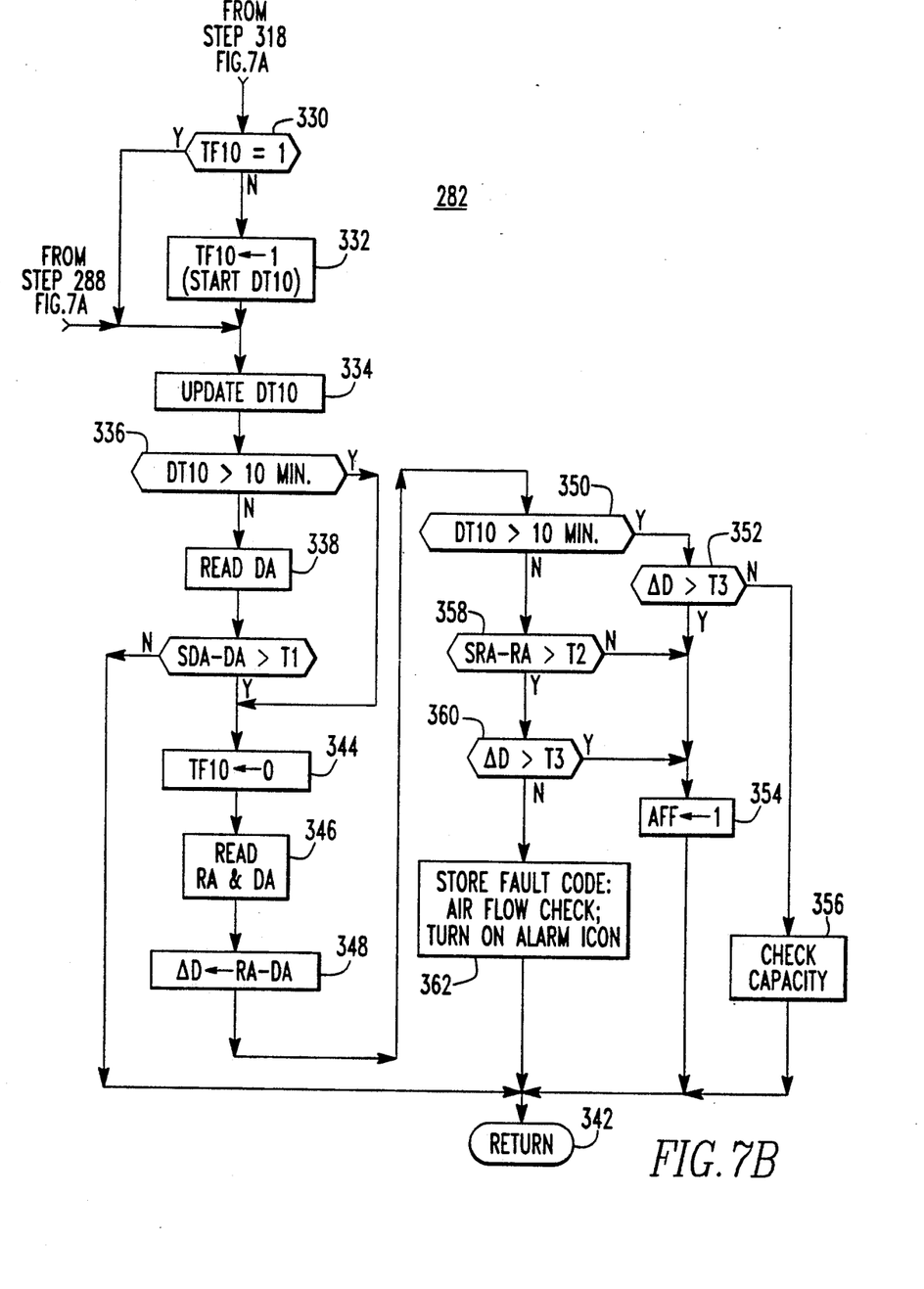

Subroutines #1, #2 and #3 called in steps 266, 270 and 274 are similar except for the values of constants T1, T2 and T3 used during the running of each subroutine. Thus, it is not necessary to illustrate and describe each subroutine separately. FIGS. 7A and 7B may be combined to provide a flow diagram of a subroutine program 282 which is run by steps 266, 270 and 274. The look-up table shown in the ROM map 242 of FIG. 5 provides the values of the constants T1, T2 and T3, depending upon which of the steps 266, 270 or 274 called the subroutine 282.

Subroutine 282 is entered at 284 and step 285 obtains the appropriate values of constants T1, T2, and T3 from ROM 122 and stores them in RAM 124. Step 286 then checks the logic level of a flag TF30 to determine if a 30 second delay timer DT30 is active. At this point in the program, flag TF30 will be a logic zero, and step 286 proceeds to a step 288 which checks the logic level of a flag TF10 to determine if a 10 minute delay timer DT10 is active. At this point in the program, flag TF10 will be a logic zero and step 288 proceeds to step 290.

Step 290 reads and stores the readings from temperature sensors 100 and 104 to obtain the temperatures RA and DA of the return air 88 and the discharge air 92. Step 292 obtains the difference ΔD between the return air temperature RA and discharge temperature DA and stores the difference value ΔD in RAM 124. Step 294 compares ΔD with constant T3 which will be 10, 8 or 6 for subroutines #1, #2 and #3, respectively, when temperatures RA and DA are in ° F., and 5.5, 4.4 and 3.3 when RA and DA are in ° C. If ΔD exceeds the appropriate value of T3, unit 20 is not in initial temperature pull down, or at least not in the steeply changing portions 234 and 236 shown in FIG. 3, and an accurate determination of correct air flow cannot be made. Thus, step 294 proceeds to step 296 which sets flag AFF to stop program 240 after step 260 on the next running of program 240, and step 296 returns at 298.

When ΔD is found by step 294 to not exceed T3, step 294 proceeds to step 300 which checks the hereinbefore mentioned timer flag TF30 to determine if delay timer DT30 is active. At this point in program 282 flag TF30 will be reset, ie., a logic zero, and step 300 proceeds to step 302 which stores the temperature values RA and DA read in step 290 at locations SRA and SDA, respectively, in RAM 124, for later use. Step 304 then sets flag TF30 to logic one, which activates software delay timer DT30. Step 306 updates, eg., increments timer DT30, and step 308 determines if timer DT30 has reached a predetermined value, such as 30 seconds. At this point in program 282, timer DT30 will not have reached 30 seconds, and program 282 exits at 310. On the next running of program 282, step 286 will find flag TF30 set and proceed directly to the timer updating step 306.

When step 308 finds that delay timer DT30 has reached 30 seconds, step 312 resets timer flag TF30 and step 314 reads and stores new temperature readings RA and DA. Step 316 calculates and stores an updated difference value ΔD. Step 318 determines how much the temperature DA of the discharge air 92 has changed over the 30 second delay period by subtracting the present temperature value DA from the stored temperature value SDA, and step 318 further compares the change with constant T1. As hereinbefore stated, if unit 20 is in the portion 234 of temperature pull down illustrated in FIG. 3, the change in DA over the 30 second time period should be relatively large. As illustrated in ROM map 242, the value of T1 may be 10, 8 or 6 for subroutines #1, #2 and #3, respectively, when temperatures RA and DA are in ° F, and 5.5, 4.4 and 3.3 when RA and DA are in ° C. If the rate of change of DA, i.e., the change in DA over the predetermined time period of 30 seconds, exceeds the appropriate value of T1, step 318 proceeds to step 320.

Step 320 determines how much the temperature RA of the return air 88 has changed over the 30 second delay period by subtracting the present temperature value RA from the stored temperature value SRA, and step 320 further compares the change with constant T2. As hereinbefore stated, if unit 20 is in the portion 236 of temperature pull down illustrated in FIG. 3, the change in RA should be small, compared with the change in DA, and as illustrated in ROM map 242, the value of T1 may be 3, 2 or 1 for subroutines #1, #2 and #3, respectively, when temperatures RA and DA are in ° F., and 1.6, 1.1 and 0.55 when RA and DA are in ° C. If the rate of change of RA, ie., the change in RA over the predetermined time period of 30 seconds, does not exceed the appropriate value of T2, the relative rates of change of DA and RA indicate proper air flow in conditioned space 21, and step 320 proceeds to step 322 which sets air flow flag AFF, and program 282 exits at 324.

If step 320 finds that the change in RA over the delay period exceeded the appropriate value of T2, there may be a problem with air flow, and step 320 proceeds to step 326 which compares the value ΔD obtained 316 with constant T3. If step 326 finds that ΔD exceeds T3, the differential indicates proper air flow, and step 322 goes to step 322 which sets air flow flag AFF. On the other hand, if step 326 finds that ΔD does not exceed constant T3, the combination of the "yes" branch of step 320 and the "no" branch of step 326 indicates an air distribution problem in conditioned space 21 ie., short cycling, and step 328 stores a fault code which identifies an air distribution problem, and an alarm icon on display 125 is turned on, to alert operating personnel. Step 328 then proceeds to the program exit 324.

If step 318 finds that the change in temperature DA over the 30 second delay period does not exceed T1, then step 318 proceeds to step 330 shown in FIG. 7B which initiates a portion of program 282 which provides a longer delay period before repeating substantially the same checks and comparisons just described relative to FIG. 7A.

More specifically, step 330 checks the logic level of the hereinbefore mentioned timer flag TF10 to determine if a delay timer DT10 is active. At this point in program 282 delay timer DT10 will not be active and flag TF10 will be found to reset. Step 330 proceeds to step 332 which sets flag TF10, to activate delay timer DT10. Delay timer DT10 provides a longer delay than provided by delay timer DT30, eg., 10 minutes. The delay time defined by timer DT10 is the maximum delay time, as program events may make it unnecessary to delay for the maximum period of time associated with delay timer DT10. Step 334 updates delay timer DT10. Once delay timer DT10 is activated, step 288 in FIG. 7A, upon subsequent running of program 282, will find flag TF10 set and proceed immediately to the timer updating step 334.

Step 336 determines if timer DT10 has reached 10 minutes. At this point in program 282, timer DT10 will not have reached 10 minutes, and step 336 proceeds to step 338 which reads and stores the present temperature DA of the discharge air 92. Step 340 then calculates the change in DA from the start of the first delay period to the present time, and compares the change with constant T1. If the change in temperature DA has not exceeded T1, the program returns at 342. Step 288 will return to step 334 on the next running of program 282, and program 282 will continue to update timer DT10 and check the change in DA until either step 336 finds that 10 minutes has elapsed, or step 340 finds that the change in temperature DA exceeds the appropriate value of constant T1. The "yes" branches of both steps 336 and 344 proceed to step 344, which resets flag TF10. Step 346 then reads and stores the current values of RA and DA, and step 348 updates the difference value ΔD.

Step 350 determines if it was the timing out of delay timer DT10 which broke the program loop. If step finds DT10 has timed out, step 352 determines if ΔD exceeds T3. If step 352 finds that ΔD exceeds constant T3, the differential indicates proper air flow, or at least that unit 20 is past a point where detection of improper air flow can be reliably made, and step 352 proceeds to step 354 which sets the air flow flag AFF, and step 354 then proceeds to program exit 342.

If step 352 finds that ΔD has not exceeded the appropriate value of T3, this fact, along with the finding in step 350 that timer DT10 has expired, which means that the change in DA has not exceeded the constant T1, indicates that there may be a problem with refrigeration capacity. Thus, step 352 proceeds to step 356 which runs a program to check for adequate refrigeration capacity, such as the programs disclosed in the hereinbefore mentioned co-pending application Ser. No. 08/046,314. Step 356 then proceeds to program exit 342.

If step 350 finds that timer DT10 did not time out, it means the program loop was broken by step 340, ie., that the change in temperature DA of the discharge air 92 has exceeded the appropriate value of constant T1. Step 350 proceeds to step 358 which calculates the change in temperature RA by subtracting the reading made in step 346 from the stored value SRA. Step 358 also compares the change with T2. If the change does not exceed T2, it indicates that the rates of change of RA and DA are consistent with proper air flow in conditioned space 21, and step 358 proceeds to step 354 which sets the air flow flag AFF, and program 282 exits at 342.

If step 358 finds that the change in RA exceeded the constant T2, step 358 proceeds to step 360 which compares the temperature differential ΔD obtained in step 348 with constant T3. If ΔD exceeds constant T3, it indicates that either the air flow is proper, or unit 20 is past a point where an accurate check of air flow can be made, and step 360 proceeds to step 354 which sets air flow flag AFF.

If step 360 finds that ΔD does not exceed constant T3, this fact, coupled with the finding in step 358 of a relatively large change in RA, indicates an air flow problem in conditioned space 21. Thus, step 360 proceeds to step 362, which, similar to step 328 stores a fault code which indicates that air flow in conditioned space 21 should be checked. Step 362 also turns on an alarm icon in display 125, and program 282 exits at 342.

We claim:

1. A method of monitoring the operation of a refrigeration unit which includes a return air inlet and a discharge air outlet in air flow communication with a conditioned space, with the refrigeration unit conditioning air returning from the conditioned space via the air inlet and discharging conditioned air back into the conditioned space via the discharge air outlet, characterized by the steps of:

detecting a short cycling condition wherein air from the discharge air outlet returns prematurely to the return air inlet, said detecting step including the steps of:

measuring the temperatures DA and RA of the discharge air and return air, respectively, detecting changes of the discharge air temperature DA and the return air temperature RA over a predetermined period of time, comparing a detected change of the temperature DA of the discharge air with a first constant, comparing a detected change of the temperature RA of the return air with a second constant, and indicating that air flow in the conditioned space is proper in response to predetermined results of the comparison steps.

2. The method of claim 1 wherein the predetermined results of the comparison steps which indicate proper air flow include the steps of:
   finding that a detected change in temperature DA of the discharge air is greater than the first constant,
   and finding that a detected change in temperature RA of the return air is less than the second constant.

3. The method of claim 1 including the steps of:
   measuring the temperature AA of ambient air,
   and selecting the values of the first and second constants as a function of the temperature AA of ambient air and the temperature RA of the return air.

4. The method of claim 1 including the steps of:
   determining the difference ΔD between the temperatures DA and RA obtained in the measuring steps,
   comparing the difference ΔD with a third constant,
   and indicating air flow in the conditioned space is proper in response to predetermined results of the steps of respectively comparing a detected change in the temperature DA, a detected change in the temperature RA, and ΔD, with the first, second and third constants.

5. The method of claim 4 wherein the predetermined results which indicate proper air flow include the steps of:
   finding that a detected change in the temperature DA is larger than the first constant,
   finding that a detected change in the temperature RA is larger than the second constant,
   and finding that the difference value ΔD is larger than the third constant.

6. The method of claim 4 including the steps of:
   measuring the temperature AA of ambient air,
   and selecting the values of the first, second and third constants as a function of the temperature AA of ambient air and the temperature RA of the return air.

7. The method of claim 1 including the steps of:
   determining the difference ΔD between the temperatures DA and RA obtained in the measuring steps,
   comparing the difference ΔD with a third constant,
   and indicating a fault condition related to air flow in the conditioned space in response to predetermined results of the steps of respectively comparing a detected change in the temperature DA, a detected change in the temperature RA, and ΔD, with the first, second and third constants.

8. The method of claim 7 wherein the predetermined results of the comparison steps which result in a fault indication include the steps of:
   finding that the change in temperature DA of the discharge air is larger than the first constant,
   finding that the change in temperature RA of the return air is larger than the second constant,
   and finding that the difference value ΔD is less than the third constant.

9. The method of claim 1 including the steps of:
   detecting changes in the temperature DA of the discharge air and in the temperature RA of the return air over a longer period of time than the predetermined period of time, when the step of comparing a detected change in the temperature DA with the first constant finds that a detected change in the temperature DA of the discharge air did not exceed the first constant,
   comparing a detected change in the return air temperature DA over the longer period of time with the first constant,
   comparing a detected change in the return air temperature RA over the longer period of time with the second constant,
   and indicating air flow in the conditioned space is proper in response to predetermined results of the comparison steps associated with the longer period of time.

10. The method of claim 9 wherein the predetermined results of the comparison steps which indicate proper airflow include the steps of:
    finding that a detected change in the temperature DA of the discharge air over the longer period of time is greater than the first constant,
    and finding that a detected change in the temperature RA of the return air over the longer period of time is less than the second constant.

11. The method of claim 9 including the steps of:
    determining the difference ΔD between the temperatures DA and RA obtained in the measuring steps after the longer period of time,
    comparing the difference ΔD with a third constant,
    and indicating a fault condition related to air flow in the conditioned space in response to predetermined results of the steps of respectively comparing a detected change in the temperature DA, a detected change in the temperature RA, and ΔD, with the first, second and third constants, after the longer period of time.

12. The method of claim 11 wherein the predetermined results of the comparisons steps which result in a fault indication include the steps of:
    finding a detected change in temperature DA of the discharge air is greater than the first constant,
    finding that a detected change in temperature RA of the return air is greater than the second constant,
    and finding that the difference value ΔD is less than the third constant.

13. A method of monitoring the operation of a refrigeration unit which includes a return air inlet and a discharge air outlet in air flow communication with a conditioned space, with the refrigeration unit conditioning air returning from the conditioned space via the air inlet and discharging conditioned air back into the conditioned space via the discharge air outlet, characterized by the steps of:
    detecting a short cycling condition wherein air from the discharge air outlet returns prematurely to the return air inlet,
    said detecting step including the steps of:
    measuring the temperatures DA and RA of the discharge air and return air, respectively,
    detecting changes of the discharge air temperature DA and the return air temperature RA over a predetermined period of time,
    comparing a detected change of the temperature DA of the discharge air with a first constant,
    comparing a detected change of the temperature RA of the return air with a second constant when the detected change of the temperature DA of the discharge air exceeds the first constant,
    and indicating that air flow in the conditioned space is proper when the detected change of the temperature RA of the return air is less than the second constant.

14. The method of claim 13 including the steps of determining the difference ΔD between the temperatures DA and RA obtained in the measuring steps when the step of comparing the detected change of the temperature RA of the return air exceeds the second constant, comparing the difference ΔD with a third constant, indicating proper air flow when the comparison step finds that the difference ΔD exceeds the third constant, and indicating a fault condition related to air flow in the conditioned space when the comparison step finds that the difference ΔD does not exceed the third constant.

15. A method of monitoring the operation of a refrigeration unit which includes a return air inlet and a discharge air outlet in air flow communication with a conditioned space, with the refrigeration unit conditioning air returning from the conditioned space via the air inlet and discharging conditioned air back into the conditioned space via the discharge air outlet, characterized by the steps of:

measuring the temperature DA and RA of the discharge air and return air, respectively, determining the change in the temperature DA of the discharge air over a first predetermined period of time, comparing the change in the temperature DA of the discharge air with a first constant, continuing the steps of determining the change in the temperature DA of the discharge air, and comparing the change with the first constant, up to a maximum predetermined period of time, when the comparing step at the end of the first predetermined period of time found that the change in temperature DA of the discharge air did not exceed the first constant, determining the change in temperature RA of the return air, when the change in temperature DA is found to exceed the first constant, over the same period of time over which the change in DA was measured, comparing the change in temperature RA with a second constant, and indicating proper air flow when the change in temperature RA is less than the second constant.

16. The method of claim 15 including the steps of:

determining the difference ΔD between the temperatures DA and RA when the step of comparing the detected change of the temperature RA of the return air exceeds the second constant, comparing the difference ΔD with a third constant, indicating proper air flow when the comparison step finds that the difference ΔD exceeds the third constant, and indicating a fault condition related to air flow in the conditioned space when the comparison step finds that the difference ΔD does not exceed the third constant.

17. The method of claim 15 including the steps of:

determining the difference ΔD between the temperatures DA and RA when the maximum period of time expires before the change in temperature DA of the discharge air exceeds the first constant, comparing the difference ΔD with a third constant, indicating proper air flow when the comparison step finds that the difference ΔD exceeds the third constant, and indicating refrigeration capacity should be checked when the comparison step finds that the difference ΔD does not exceed the third constant.

* * * * *